United States Patent [19]

Brown et al.

[11] Patent Number: 5,558,890
[45] Date of Patent: Sep. 24, 1996

[54] MULTILAYERED PUFFED R-T-E CEREAL AND HIGH INTENSITY MICROWAVE METHOD OF PREPARATION

[75] Inventors: George E. Brown, West St. Paul; Edward C. Schwab, New Brighton; Terry R. Harrington, Albertville, all of Minn.

[73] Assignee: General Mills, Inc., Minneapolis, Minn.

[21] Appl. No.: 329,405

[22] Filed: Oct. 27, 1994

[51] Int. Cl.$^6$ .................................................. A23L 1/182
[52] U.S. Cl. ........................ 426/94; 426/242; 426/249; 426/559
[58] Field of Search ........................... 426/94, 559, 249, 426/242

[56] References Cited

U.S. PATENT DOCUMENTS

| | | |
|---|---|---|
| D. 334,274 | 3/1993 | Creighton et al. . |
| D. 347,515 | 6/1994 | Creighton et al. . |
| 3,499,766 | 3/1970 | Vollink et al. ........................ 426/559 |
| 4,940,593 | 7/1990 | Duffy . |
| 5,092,757 | 3/1992 | Stein et al. . |
| 5,124,161 | 6/1992 | van Lengerich et al. . |
| 5,165,950 | 11/1992 | Boehmer et al. ........................ 426/242 |
| 5,176,936 | 1/1993 | Creighton et al. . |
| 5,196,218 | 3/1993 | Schwab et al. . |
| 5,338,556 | 8/1994 | Schwab et al. ........................ 426/242 |

*Primary Examiner*—Helen Pratt
*Attorney, Agent, or Firm*—John A. O'Toole; L. MeRoy Lillehaugen

[57] ABSTRACT

Disclosed are puffed multilayered R-T-E breakfast cereal pieces and methods of preparation. In preferred embodiments, the cereal pieces have at least three cereal layers. The bulk density ranges from about 0.06 to 0.15 g/cc. The methods for fabricating the present multilayered R-T-E cereal pieces comprise: A) preparing at least three separate sheets of cooked cereal dough(s), B) layering the sheets with pressure to form a laminated sheet, C) forming individual pieces from the laminated sheet, D) drying the pieces to 9% to 13% moisture, and E) high intensity microwave puffing the pieces to form R-T-E cereals with multiple layers. The high intensity microwave field is characterized by a field strength of about 150 to 350 V/cm.

47 Claims, 1 Drawing Sheet

5,558,890

MULTILAYERED PUFFED R-T-E CEREAL AND HIGH INTENSITY MICROWAVE METHOD OF PREPARATION

1. TECHNICAL FIELD

The present invention relates to food products and to their methods of preparation. More particularly, the present invention relates to ready-to-eat cereals and to their methods of preparation.

2. BACKGROUND

Ready-to-eat ("R-T-E") cereals are popular food items. Over the years, R-T-E cereals have been prepared in a wide variety of shapes, sizes, compositions, textures, flavors and the like. Especially popular are those R-T-E cereals comprising a blend of several cooked cereal grains.

Such multi-grain R-T-E cereals are well known. Generally, the individual R-T-E pieces are uniform in composition throughout the cereal piece. The homogeneous composition can include a plurality of cereal grains, e.g., corn and rice. Alternatively, it is also conventionally known to employ blends of R-T-E cereal pieces comprising more than one cereal, e.g., one-fourth of the pieces being oat based, one-fourth being wheat based, one-fourth corn based and one-fourth barley/rice based. Typically, the individual cereal pieces are cooked and prepared, including puffing, in separate batches of one cereal composition. Thereafter, the individual batches of puffed products are blended together prior to packaging.

Attempts at incorporating more than one cereal composition into an individual cereal piece having distinct portions of a single composition, however, have met great difficulty. Generally, any attempt at providing such cereal pieces results in a blending and bleeding of the compositions together to form an indistinct blend of flavor and/or an undesired brown or even gray color. More recently, however, composite cereal pieces comprising an upper layer of one composition and a second layer of a second composition have been introduced into the market. Such cereals have been sold under the trademark Crispix. Such cereals comprise an upper discontinuous layer (e.g., a grid) of one cereal composition such as wheat with a lower discontinuous layer of a second cereal composition such as rice. Multicolored two-ply R-T-E cereals are also known (see, for example, U.S. Pat. No. 4,940,595, issued Jul. 10, 1990 to D. K. Duffy entitled "Multicolored R-T-E Cereal and Method of Preparation) which rely upon using a highly puffabale cereal dough such as rice flour.

In view of the increasing popularity of multi-grain cereals and especially whole grain cereals, it would be desirable to provide a single R-T-E cereal piece having distinct portions (as opposed to a uniform blend) of different R-T-E cereal compositions. Even more desirable would be puffed R-T-E cereal pieces with distinct portions of different R-T-E cereal compositions.

Provision of such heterogeneous cereals, however, requires several problems to be overcome. One problem is to provide for adherence between two cooked cereal doughs of different composition while preventing substantial co-mingling thereof. Another problem is to provide a finished product that is puffed. Provision of two layers of puffed products while difficult can be accomplished using at least two techniques. However, providing a product with three puffed layers is much more difficult.

In the provision of a puffed two-layered or two-ply R-T-E cereal, the first technique involves puffing each cereal portion separately such as by direct expansion upon exiting of a cooker extruder. While still hot and plastic, the two puffed product streams can be combined as upper and lower layers and then next immediately crimped and formed into individual pieces in a rotary crimper/cutter roll. However, the provision of a puffed third phase intermediate is extremely difficult to handle without collapsing the third phase.

As a consequence of these difficulties in providing multiple plies of previously puffed cereal dough prior to individual piece formation, it becomes desirable to employ a second technique, namely to prepare the puffed pieces from unpuffed two-ply R-T-E puffable pellets.

While unpuffed multilayered R-T-E cereal pellets can be prepared, it is extremely difficult to puff such laminated pellets. As the pellet thickness increases, its puffability decreases. In a three-ply laminated pellet, conventional puffing techniques, while perhaps successfully puffing the upper and lower layers tend to fail to expand any intermediate layer(s). Moreover, as the exterior layers begin to expand, the expanded material increasingly acts as an insulator against the heat transfer from the pellet exterior to the pellet interior that is needed to accomplish puffing of the interior layer. Finally, the boundary between the layers can restrict heat transfer thereby impeding the puffing of the interior layer. The resultant product instead of having a desirably uniform, crisp and light texture has a hard and unappealing unpuffed center layer(s).

While such problems of unpuffed intermediate regions for multi-ply laminated pellets are severe even with easily puffed or high puffable cereal doughs fabricated from refined cereal dough compositions, such problems are aggravated when less easily puffed whole grain cereal compositions are employed. The problems are also made worse when the products further comprise an intermediate non-cereal layer such as a fruit puree.

Notwithstanding the provision of an R-T-E cereal piece having upper and lower layers which differ in composition, there is a continuing need for novel and visually appealing R-T-E cereal pieces characterized by a plurality of discrete cereal compositions in one cereal piece.

Surprisingly, a convenient process has now been discovered by which such novel R-T-E cereal pieces can be realized. The present methods involve the steps of fabricating multilayered cooked cereal dough pellets and then puffing the pellets employing high intensity microwave energy.

SUMMARY OF THE INVENTION

Disclosed are multilayered, puffed R-T-E cereal pieces. The R-T-E cereals comprise at least three discrete layers of cooked cereal dough. The bulk density of the finished R-T-E cereals range from about 0.06 to 0.15 g/cc. The cereals are essentially characterized by an intermediate cereal dough layer having an expanded volume relative to its initial volume.

In its method aspect, the present invention resides in comprising the steps of: providing separate segregated sheets of cooked cereal dough, compressively layering the separate sheets to form a laminated sheet, forming individual pieces from the sheet, forming individual pieces from the laminated sheet, drying the pieces to 9% to 13% moisture, and high intensity microwave puffing the pieces to form R-T-E cereals with puffed multiple layers. The high intensity microwave field is characterized by a field strength of about 150 to 350 V/cm.

In additional embodiments, the present invention resides in laminated R-T-E cereal pieces wherein one or more of the layers have one major surface having corrugations.

DETAILED DESCRIPTION OF THE INVENTION

Figure 1:
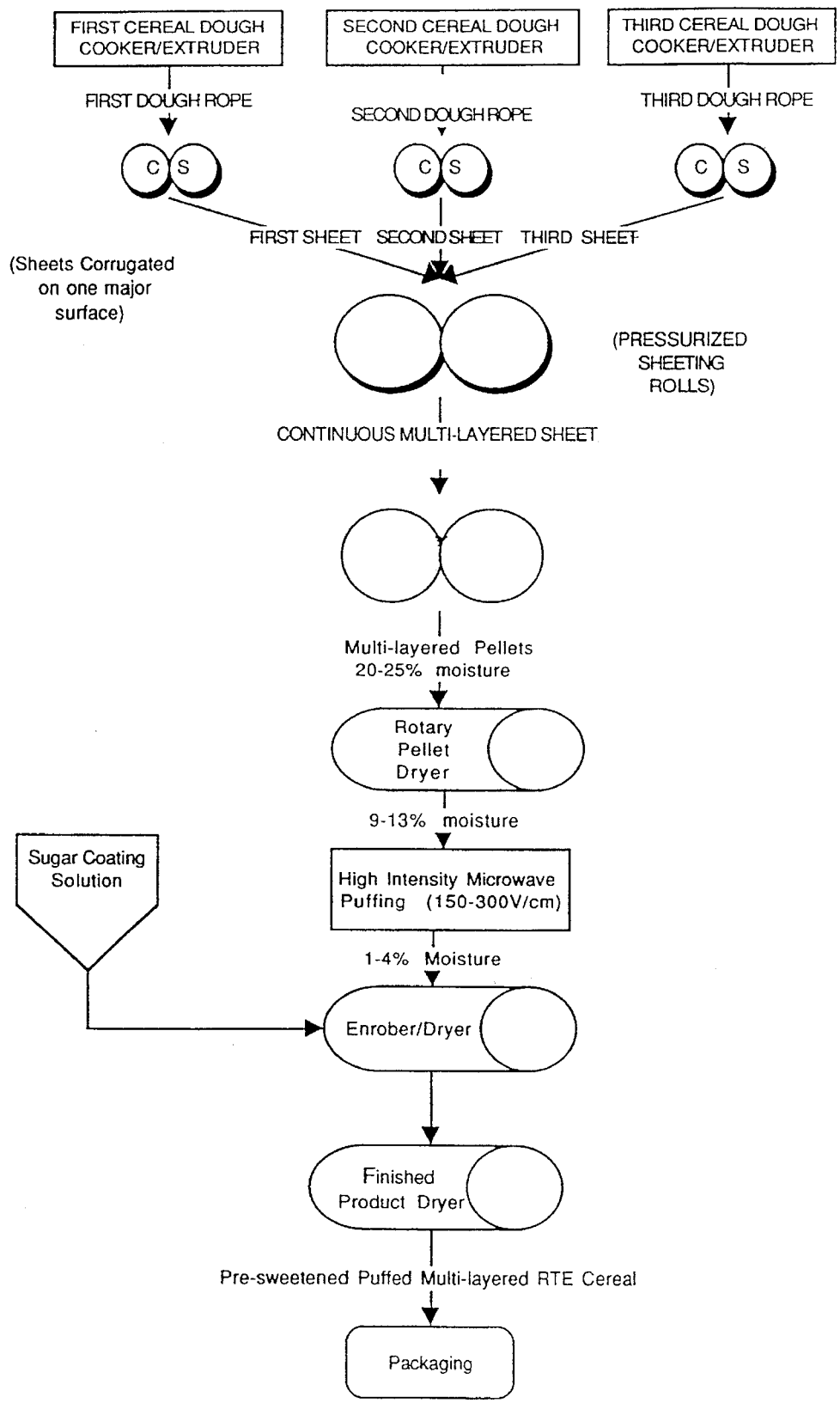
FIG. 1 shows a flow diagram illustrating the general method of carrying out the present processes for producing puffed, multilayered R-T-E cereal pieces.

The present invention relates to puffed, multilayered R-T-E cereal pieces and to their methods of preparation. In preferred embodiments, the cereal pieces can have a plurality of puffed layers including an upper layer and a bottom layer and at least one intermediate layer, each of which is characterized as being visually distinct. Each of the product preparation steps are described below in detail.

Throughout the specification and claims, percentages are by weight and temperatures in degrees Fahrenheit, unless otherwise indicated.

A. Providing Individual Cereal Dough Sheets

Reference is now made to the drawing which illustrates the preferred method for practicing the present invention. In FIG. 1, it is seen that the first essential step of the present R-T-E cereal preparation process is to provide a laminated cereal dough sheet having a plurality of distinct bound layers of cooked cereal dough. Any technique for providing such a laminated sheet, or in continuous operations, continuous laminated ribbon can be used to provide the laminated piece.

In one preferred embodiment this step can involve the substeps of A1) providing at least three separate sheets of cooked cereal doughs, preferably each of a different composition, flavor and/or color, and A2) compressively layering the separate sheets to form a single sheet having the layers bonded together. In another embodiment, the steps can be practiced by co-extruding at least three layers of unexpanded cooked cereal dough.

The art is replete with teachings and methods for preparing cooked cereal dough compositions and forming such compositions into sheets. The skilled artisan will have no difficulty in providing such cooked dough sheets as a starting material.

Generally, however, in the conventional preparation of cooked R-T-E cereal doughs the essential cereal ingredients and other ingredients are combined with water and heat and mild pressure to cook or gelatinize the starchy component of the cereal ingredients. Thereafter, the cooked cereal is combined with the other ingredients and mixed with low or high shearing to form a cooked farinaceous dough. The dough (optionally with added vitamin/mineral fortification) is formed into sheets by conventional means such as by feeding a dough rope into one or more sheeting rolls to form the present cooked cereal dough sheets.

A variety of well known cooking methods and equipment can be used to prepare a cooked cereal dough. For example, the cereal blend can be processed in a cooker extruder or in a pressurized and agitated steam cooker each of which form a cooked cereal dough. In another embodiment, the cooking and dough forming steps are performed simultaneously in a conventional high pressure, high shear cooker extruder (e.g., single screw or twin screw extruder).

The present invention is particularly suitable for use in connection with the preparation of whole grain R-T-E cereal products from whole grain based cooked cereal doughs. Even more particularly, the present invention is suitable for use in connection with wheat based, especially whole wheat, flaked R-T-E cereals having the following essential ingredients:

| Ingredient | Weight % | Amount (Preferred) |
|---|---|---|
| Bumped whole wheat, oats, corn, barley or rice | 80%–90% | 100 lbs |
| Sugar | 5%–15% | 8–12 lbs |
| Malt syrup | 1%–3% | 1–3 lbs |
| Salt | 0.5%–3% | 0.5–3 lbs |

In the preparation of whole grain based cooked cereal doughs, the whole grains typically require or benefit from extended cooking times. Traditional, low pressure, low shear, extended cook time batch or semi-continuous cookers can be used. The whole grains (whether as intact grains or cut into various sized particles) such as whole wheat are added to water, salt and optionally malt and/or sugar(s) and cooked for extended times to form a cooked whole grain cereal having a desirable cooked flavor. In another embodiment, the whole grain, water and minor ingredients can be formed quickly into a cooked cereal dough using a cooker extruder. Since cook times in a cooker extruder are so short, in one minor variation, the grains are partially cooked in a conditioner with steam (atmospheric or slightly pressurized) prior to being fed to the extruder. Such a preconditioning or partial cooking allows the grain to develop a better cooked flavor.

Of course, the present cooked cereal doughs can additionally comprise other whole grain cereals including those of corn, oats, rice, barley and mixtures thereof. While these major grains are most popular, minor useful grains include amaranth, millet, sorghum, triticale, flax and mixtures thereof.

The term "refined cereal doughs" is used in contrast to whole grain cereal doughs. "Refined" cereal doughs as used herein refers to those R-T-E cooked cereal dough compositions that do not contain whole grain ingredients (i.e., contain less than about 2% whole grain cereal flour ingredients) but comprise conventional white cereal flours. More particularly, refined cereal doughs are essentially characterized herein by a low level of a fiber content (typically supplied by the whole grain ingredient and/or germ ingredient). Refined cereal doughs desirably contain herein less than about 5% total dietary fiber and less than 2% cereal germ ingredient. Both the fiber and the oil generally adversely affects the ability of the dough composition to expand. Additionally, refined cereal doughs can comprise "highly refined" cereal doughs. By "highly refined" herein it is meant cereal doughs comprising either pure cereal starch fractions and/or sucrose. Adding pure cereal starches and sucrose each have a beneficial effect on the dough compositions ability to expand. Highly refined cereal dough compositions herein comprise about 1% to about 25% of a cereal starch ingredient and/or about 10% to 40% by weight of sucrose.

Of course, within this general outline of cereal processing for the provision of cooked cereal doughs, a wide variety of particular methods and variations can be used Desirably, the cooked cereal dough has a moisture content of about 18% to 35% prior to formation of the laminated sheet, preferably 18% to 26%, and more preferably about 20% to 25%.

The temperature of the cereal doughs during sheet formation can range from about 250° to 275° F. (120° to 135° C.), preferably about 260° to 275° F. (126.6° to 135° C.).

The cooked cereal dough is then formed while still warm into a sheet(s) or continuous ribbon in conventional manner. Useful herein are conventional roller sheeters. Preferably the sheets are continuous and imperforate.

The thickness of the sheets desirably ranges from about 0.025 to 0.15 inch (635 to 3810 μm). Preferred thicknesses range from about 0.025 to 0.055 inch (635 to 1400 μm) and for best results about 0.030 inch (760 μm).

In the present process, a separate quantity of low moisture, warm cooked cereal dough of one composition, flavor and/or color is prepared. Separately, second and third quantities of warm, low moisture, cooked cereal dough of a second composition, etc. are also prepared. In continuous production, separate processing streams are each dedicated to providing cooked dough ribbons of a single composition. Depending on the end product desired, the quantities of first, second or additional cooked cereal doughs can either be the same or different. The composition of the doughs may either be the same or different as well. Moreover, the sheet thickness may vary within the above described ranges if desired. Conveniently, the cooked dough sheets can be of approximately equal size.

In highly preferred embodiments, one or more of the cooked cereal dough sheets are fabricated with at least one major surface having corrugations. The corrugated sheets can be prepared by having one sheeting roll fabricated with corrugations. In another variation, the sheet is run through a second set of rollers having a corrugated roll to impart the corrugations to the sheet(s). Preferably, the layers are arranged so that the corrugated layers are in confronting relationship with the smooth major surface of the adjacent layer. Surprisingly, this corrugated-to-smooth confronting relationship minimizes subsequent undesirable delamination. In less preferred embodiments, one or more layers lack the surface corrugations or do not have the corrugated surfaces in confronting relationship.

The particular shape of the corrugations are not critical. Conveniently, the corrugations can range from 3 to 15 per inch and from about 0.005 to 0.015 inch (125 to 375 μm) in depth. The corrugations of any one layer can be parallel to those of the other layers or at any angle thereto, e.g., perpendicular.

It is important that at least a portion of the layers be bound together to prevent total delamination upon puffing and complete separation of the layers from each other. In certain embodiments, only end regions or middle regions of the layers are bound together. Such partial bonding can result in a pleasing variety of end shapes to the present finished products.

B. Multi-Ply Laminated Sheet Forming

In the next essential step, the individual ribbons or layers are combined to form a single laminated sheet or multilayered ribbon characterized by at least three plys or layers of cereal dough. The sheeting step is practiced using conventional sheeting apparatus, generally a pair of counter-rotating compression rollers. The lamination operation preferably involves compressive roll sufficient to prevent delamination during puffing. Good results are obtained using pressures ranging from about 100 to 5,000 psi (600 to 30,000 kPa), preferably about 100 to 3,000 psi (600 to 9,000 kPa).

The laminated or multi-ply sheet, or preferably continuous ribbon so formed is further characterized by a moisture content still ranging from about 18% to 26%, preferably about 22%, and a temperature of about 140° to 170° F. (60° to 76.6° C.), preferably about 150° to 160° F. (65.5° to 71.1° C.). (Some cooling typically naturally occurs between the previous dough sheeting step and the sheet forming step.) In one embodiment of the present invention, the multilayered sheet so formed is subsequently processed in conventional manner to form individual puffable cereal pieces or pellets. These steps can variously comprise forming, e.g., stamp cutting, the sheet into variously sized and shaped pieces, drying and packaging. Also useful are cutter rolls.

Optionally, the laminated sheets or ribbons can be fabricated with additional non-cereal intermediate layers and/or materials. For example, the laminated sheets can be fabricated with an intermediate sweetened fruit puree layer. An exemplary suitable fruit composition has the following formulation:

| Ingredient | Fruit Puree Weight % (dry weight) |
|---|---|
| Fruit puree solids | 10%–60% |
| Nutritive carbohydrate sweetening agents | 0%–50% |
| Moisture | 10%–50% |

Since the moisture is removed subsequently, the moisture content of the fruit layer is selected for convenience.

The intermediate fruit layer can be applied over the intermediate cereal dough layer prior to formation of the laminated sheet or continuous ribbon. The fruit layer can range in thickness from about 0.080 to 0.160 inch (2,000 to 4,000 μm).

In other variations, a fat-based layer can be employed, e.g., a frosting, or a "summer" confectioner's composition, or a peanut or other nut butter spread.

In still another variation, the products can be fabricated with a variety of particulate materials that can be conveniently applied to the intermediate dough layer prior to formation of the laminate. For example, particulates can comprise nut pieces, (e.g., peanut, almonds, coconut and mixtures thereof), seeds (e.g., sesame, flax) grain pieces, (e.g., oatmeal). Such particulates can comprise any solid material to provide the finished R-T-E cereal pieces with desired visual, nutritional and/or organoleptic attributes. In another variation, the cereal pellets are free of topically applied particulate or liquid antistickiness materials.

While the above description generally relates to preferred layers that are continuous or imperforate, the skilled artisan will appreciate that one or more layers can be perforated, e.g., a lattice or net of cooked cereal dough.

C. Forming the Sheets into Pieces

Next, the sheets or ribbons are formed into individual pieces of desired shape and size. Conventional cutting or stamping techniques and equipment can be used to practice this step. Generally, larger pieces are prepared for snack applications compared with the generally smaller pieces used for R-T-E cereals.

D. Drying to Puffable Moisture Contents

In the next essential step, the laminated pieces so formed are essentially dried to puffable moisture contents to form the present puffable laminated R-T-E cereal pellets. Conventional pellet dryer apparatus and techniques can be employed to practice the present drying step. Generally, the finish moisture content to provide puffability ranges from about 6% to 15%, preferably about 8% to 13%.

The resultant laminated products are generally characterized by a cumulative layer thickness of about 0.050 to 0.500 in. For better results in terms of hardness of the final product, the pellets have cumulative thicknesses ranging from about 0.1 to 0.2 inch and more preferably about 0.80 to 0.150 inch. The pellets have a pellet count of about 12 to 40. The bulk density of the pellets range from about 0.25 to 0.7 g/cc.

E. High Intensity Microwave Puffing

The present methods further essentially comprise the step of subjecting the puffable laminated R-T-E cereal pellets to a high intensity microwave field. In the present invention, a high intensity microwave heating step is employed in substitution for the conventional toasting or puffing steps.

The exposure of the unpuffed laminated R-T-E cereal pellets to the high intensity microwave field is continued for sufficient time to expand (e.g., about 3 to 15 expansion ratio) and dry the pellets to desired finish moisture levels and to impart to the finished pellets the desired toasted flavor benefits taught herein.

The results of the present methods are additionally surprising because when conventional toasting and puffing apparatus and techniques are employed to process such relatively laminated pellets, the resultant finished products exhibit unacceptably hard and dense properties.

Importantly, the present high intensity microwave exposure step is to be distinguished from heating of the unpuffed cereal base pieces in a conventional microwave oven. A conventional microwave oven is characterized by a relatively low field intensity, i.e., about 10 to 20 V/cm. Microwave field intensity can be described, of course, in various ways. In the present invention, the microwave field intensity is described in a conventional manner as a voltage gradient in free space, e.g., volts per centimeter ("V/cm"). For comparison, the field strength of the present invention is about 3 to 10 or more times greater than achieved in a conventional consumer microwave oven. Such high microwave field intensity can in turn involve high energy dissipation (>100 w/g) in the product. In contrast, in a conventional microwave oven, as the unit's rated power increases, generally the unit's cavity size also increases so that the field strength remains relatively constant. This power density feature is important not only so that the operating/cooking performance remains relatively uniform regardless of cavity size but also to provide premature burn-out of the magnetron by reverse channeling or microwave reflection through the wave guide.

In the present invention, the cereal base pieces are desirably subjected to a microwave density field ranging greater than 125 V/cm or between about 3 to 10 times ("3×–10×") conventional microwave field intensity, preferably 125 to 350 V/cm, more preferably 150 to 300 V/cm. Also, it is preferred to use higher microwave frequencies. Thus, between the two licensed MW frequencies permitted at present, a 2450 MHz frequency is highly preferred to 915 MHz. Higher frequencies importantly give more uniformity in field strength which in turn can result in greater uniformity in the finished product.

Measurement and/or calculation of field strength can be troublesome. Useful to measure such high intensity microwave field strength herein is a Microwave E-Field Probe or meter (Model No. MEF-1.5) available from Luxtron Corp. (Mountain View, Calif.).

Microwave equipment that can provide the desired field strength is commercially available. Useful herein for practicing the present methods are industrially sized microwave ovens from Cober Electronics, Inc. and, preferably APV Baker, Inc. (For a good description, see GB 2,193,619A by R. J. Meredith and John Milton.) Minor modifications to the equipment may be required to adapt the equipment from a known application, e.g., rubber curing, to the sanitary standards that are conventional for food processing.

The particular exposure times will vary depending upon such factors as the degree of toasting preferred, the microwave performance characteristics of the equipment selected including its microwave field characteristics, the microwave absorbing characteristics of the cereal base, the quantity of pieces being processed at any time, the starting and ending moisture contents, flake thickness and composition, shape, etc. However, good results generally are obtained when the unpuffed cereal flakes are exposed for times ranging from about 5 to 45 seconds. Better results in terms of finished volume and texture as well as toasting and stability improvements are when exposure times range from about 10 to 30 seconds. For best results, exposure times desirably range from about 15 to 25 seconds. Generally, longer exposure times are selected when greater toasting is desired.

The degree to which an unpuffed cereal piece or pellet such as the present "unpuffed" flake or a cereal pellet expands upon finish heating can be expressed in several conventional ways. The first way and most frequently used is to express the finished product in terms of bulk density, e.g., X ounces per y cubic inches (e.g., 6 to 29 oz per 124 $in^3$). Typically, the volume measurement selected reflects the cereal manufacturer's standard or most frequently sold carton's volume size. Often, these bulk densities are converted to standard units, e.g., 0.5 to 2.3 $oz/in^3$ or expressed metrically as 0.08 to 0.4 g/cc.

A second expression of expansion is referred to as the expansion ratio. The expansion ratio is merely the bulk volume of the finished product divided by the bulk volume of the unpuffed cereal pellets or other starting material resulting in a dimensionless number. Typical expansion ratios for finished R-T-E cereals herein range from about 3 to 10 ("1.5× to 3×"). In contrast, finished conventional puffed R-T-E cereal products typically have higher expansion ratios, e.g., about 3.5 to 9. For comparison, good popcorn has an expansion ratio of greater than 20.

Surprisingly, the use of conventional home microwave units cannot be used in substitution for the high intensity microwave units. Home oven microwave units employ insufficiently high microwave field strengths to successfully puff all the layers of a multiple layered R-T-E cereal pellet. This deficiency is particularly noticeable when used to puff multiple pellets having a fruit layer.

A surprising advantage of the present method is that laminated finished products can be obtained having substantial expansion ratios even when fabricated from cooked cereal doughs comprising substantial amounts of whole grain cereal ingredients.

A further surprising benefit provided herein is that the toasted cereal pieces obtained by the present methods beneficially dramatically exhibit enhanced stability, especially when comprising a triglyceride component, which in turn provides the product with dramatic improvements in shelf life and product quality. This feature is especially desirable for R-T-E cereals fabricated from cereal compositions comprising the oil bearing germ fraction or lipid fraction, especially whole grain compositions such as whole wheat, whole corn, whole barley, whole oats, white rice, whole rye, whole flax or mixed whole grain compositions. An additional advantage is that the present products can be formulated so as to reduce or eliminate added oil stabilizing ingredients such as antioxidants.

In certain embodiments, the post sheeting R-T-E processing can additionally comprise such steps as toasting, sugar coating, puffing, in various combinations and sequences.

The finished puffed, laminated R-T-E cereal products include both 1) regular and 2) presweetened and/or coated products prepared therefrom.

After having been formed into desired shapes and sizes, the pieces are dried to a moisture content of about 9% to 13%. Thereafter, the reduced moisture pieces are puffed by rapid heating using high intensity microwave heating. The drying time is controlled to achieve a moisture level of about 2% to 4%.

In certain highly preferred embodiments of the present invention, the microwave toasted R-T-E pieces additionally include a flavor coating such as a presweetening coating. Well known compositions and presweetener coating application techniques can be employed both for sugar coating or when various high potency sweeteners, e.g., aspartame or potassium acetylsulfame are used. In more preferred embodiments, the presweetening coating comprises sugar and/or corn syrup, a flavor constituent, oil and/or vitamins. The addition of a flavor constituent to the sugar coating solution is preferred due to flavor losses that can occur from the frying, toasting or puffing steps practiced herein. These steps, due to their heat application, tend to drive off the volatile flavor constituents leading to flavor degradation or loss. In certain other preferred embodiments, the coating can also include particulates such as fruit and nut pieces and/or small cereal grain pellets.

An optional conventional toasting operation can be employed to enhance the color and flavor of the resultant cereal product. However, in contrast to most conventional methods that toast unpuffed pellets, the present optional toasting step is practiced using the puffed R-T-E cereal as the treated material. Toasting is accomplished by heating the pellets, usually to 200° to 400° F. (93.3° to 204.4° C.).

After microwave toasting, the microwave treated finished laminated R-T-E flake cereal is allowed to cool to ambient temperature and then subsequently packaged and distributed in conventional manner.

The puffed, multilayered R-T-E cereals prepared as described can be packaged and distributed in conventional manner.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the R-T-E cereal art, can be undertaken without departing from the spirit and scope of the invention.

EXAMPLE 1

A laminated multilayered R-T-E cereal of the present invention is prepared according to the following process. Three individual batches of cooked cereal dough were prepared. Separate formulas are used, containing the following ingredients and percents by weight (dry basis).

Formula No. 1
White Rice Formula

| Ingredient | Weight % |
| --- | --- |
| White rice flour | 70.0 |
| Brown rice flour | 13.0 |
| Sugar | 7.7 |
| Coconut oil | 3.0 |
| Salt | 1.0 |
| Wheat starch | 5.2 |
| Trisodium phosphate | 0.1 |
| | 100.0% |

Formula 2
Yellow Corn

| Ingredient | Weight (dry basis) |
| --- | --- |
| Yellow corn cones | 72.0 |
| Oat flour | 5.5 |
| Wheat flour | 10.0 |
| Sugar | 8.0 |
| Coconut oil | 2.0 |
| Salt | 2.5 |
| | 100.0% |

Formula 3
Brown Wheat

| Ingredient | Weight % |
| --- | --- |
| Cut wheat | 40.0 |
| Rice flour | 33.0 |
| Sugar | 15.0 |
| Coconut oil | 3.5 |
| Dextrose | 4.3 |
| Salt | 2.5 |
| Non-fat dry milk | 1.7 |
| | 100.0% |

Individual batches of the above formula were prepared.

The doughs were separately cooked in conventional manner using a single screw cooker extruder with preconditioning. The doughs were cooked to a moisture of approximately 20% to 22% and a temperature of 290° F. (143° C.).

Each of the three formulas were cooked using a conventional single screw cooking extruder. Formula "1" was cooked to 290° F. and 20% to 22% moisture. Formula "3" was cooked to 22% to 24% moisture and 280° F. (138° C.). Formula "4" was cooked to 24% to 26% moisture and 270° F. (132° C.).

The warm, cooked, colored doughs were then formed into sheets using a conventional sheeter/forming roll with one corrugated face to form four individual sheets each having one major face having corrugations. The moisture was 20% to 22% and the temperature was approximately 260° F. (126.6° C.).

Thereafter, the corrugated dough sheets were stacked horizontally with each corrugated face positioned downwardly. The layered sheet so stacked and arranged was then fed to a set of compression rolls to form a laminated sheet.

This multiple layered sheet was then cut into various shapes and sizes using a conventional rotary cutting unit. The shapes included squares, hexagons, triangles and parallelograms.

The shaped pieces were then dried from 20% to 22% moisture down to approximately 10% moisture. The drying unit was a conventional forced air convection dryer. The pieces were dried at 180° F. for 30 minutes.

The dried pieces were then puffed in an APV high intensity microwave unit at 150 V/cm for 20 seconds. The puffed product density was 215–280 grams per 130 in$^3$. This is similar in density and texture to other ready-to-eat cereals. The final moisture was approximately 2% to 3%. The R-T-E cereals so prepared were characterized by having a plurality of layers that were visibly discrete.

EXAMPLE 2

A variation of the above is to produce a multiple layer piece in which a fruit layer is substituted for one of the intermediate cereal dough layers.

The cooking, sheet forming, cooling, warming, sheeting, cutting, drying and puffing methods are all identical to Example 1.

The fruit layer had the following composition:

| Ingredient | Weight % (Dry Basis) |
| --- | --- |
| Strawberry solids | 28.65 |
| Sucrose | 55.62 |
| Others | 15.73 |
| | 100.00% |

Finished R-T-E cereals of equivalent puffed properties are prepared when the strawberry ingredient is replaced with equivalent amounts of cherry, blueberry, grape, raspberry, apricot, pear, raisin and mixtures thereof.

EXAMPLE 3

Another variation employing a process similar to that of Example 1 is to produce an R-T-E cereal piece that is toasted. The method is similar to that described in Example 1 except that the microwave heating step is continued for an additional 2–10 seconds.

EXAMPLE 4

Another variation employing a process similar to that of Example 1 is to produce a puffed, multilayered R-T-E cereal that is presweetened with a sugar coating.

EXAMPLE 5

Still another variation of each of the above is to apply a sugar coating to the cereal pieces. This is done in a conventional manner by spraying a sugar based slurry, with or without flavor additive, onto the puffed pieces in a drum enrober. The coated pieces are then dried down to approximately moisture in a conventional forced air dryer. Another variation is to produce a puffed multi-layered piece with refined cereal dough with each layer from a particular grain. For example, white rice, yellow corn, brown wheat. A white, yellow and brown cereal piece is produced using the formulas of Example 1 except that for the white rice formulation the following brown rice formula is used.

| Brown Rice Formula | |
| --- | --- |
| Ingredient | Weight % |
| Brown rice flour | 80.0 |
| Sugar | 5.7 |
| Coconut oil | 2.3 |
| Salt | 2.3 |
| Dextrose | 3.3 |
| Non-fat dry milk | 1.8 |
| Wheat starch* | 4.5 |
| Trisodium phosphate | 0.1 |
| | 100.01% |

*Wheat starch supplied by General Mills, Inc. under the brand name Aytex P or Paygel P.

The resulting product was a single multilayer multi-finished R-T-E cereal piece of yellow, white and brown, each color consisting of a separate grain composition.

What is claimed is:

1. A method for preparing a multilayered puffed farinaceous piece comprising the steps of:
   A. providing a laminated sheet having at least three discrete layers at least one of which layers is fabricated from an unpuffed puffable cooked cereal dough adhered to at least a portion of each other by a bond formed by mechanical compression, wherein each layer has a first and second major face and wherein the cumulative thickness of the layers ranges between about 0.050 to 0.500 in.;
   B. forming the sheet into pieces;
   C. drying the pieces to a moisture content of about 9% to 13% to form dried puffable laminated cereal pellets; and
   D. puffing the cereal pellets by exposure to a high intensity microwave field having a field strength of about 125 to 350 V/cm to form puffed multilayered cereal pieces.

2. The method of claim 1
   wherein in Step A each layer ranges in thickness from about 0.025 to 0.055 in.

3. The method of claim 2
   wherein the cumulative sheet thickness ranges from about 0.050 to 0.090 in., and
   wherein in Step A the dough has a moisture content of about 18% to 35%.

4. The method of claim 3
   wherein at least one cereal dough layer is of a different color or composition and wherein at least one layer has at least one major face having corrugations.

5. The method of claim 4 wherein Step A comprises the substeps of:
   A1. providing at least three workable cooked dough sheets to form aligned top, bottom and intermediate layers, and
   A2. forming the dough sheets into a single laminated sheet having at least three distinct plies adhered to at least a portion of each other.

6. The method of claim 4
   wherein Step A includes the substeps of:
   providing at least three cooked cereal doughs and co-extruding the cereal doughs in the form of a laminated sheet.

7. The method of claim 6
   wherein at least one layer comprises a whole wheat based cooked cereal dough.

8. The method of claim 7
   wherein at least one layer comprises a corn based cooked cereal dough.

9. The method of claim 8
   wherein the cereal pellets are free of topically applied particulate or liquid anti-stickiness materials.

10. The method of claim 9
    wherein in Step B, the pieces are cut to form a peripheral crimp seam peripherally binding together the layers.

11. The method of claim 10 further including the substep of:
    providing the ready-to-eat cereal pieces with a presweetening coating.

12. The method of claim 11 further including a fruit paste layer intermediate at least two dough layers.

13. The method of claim 4 wherein at least one layer comprises a whole grain based cooked cereal dough.

14. The method of claim 13 further comprising the step of:
toasting the puffed cereal pieces to toast and finish dry the pieces to form toasted ready-to-eat cereal pieces having a moisture content of less than 3% by weight.

15. The method of claim 13 wherein in Step A the sheet further includes at least one layer of a non-cereal material positioned between at least two cereal dough layers.

16. The method of claim 15 wherein in Step C the pellets have a pellet count of 12 to 40 per 10 g, and
wherein in Step A each layer ranges in thickness from about 0.025 to 0.045 in.

17. The method of claim 16 wherein at least one dough sheet is fabricated from a whole grain cooked cereal dough selected from the group consisting of wheat, rice, corn, oats and barley.

18. The method of claim 17 wherein at least one cooked cereal dough layer comprises a whole wheat based cooked cereal dough.

19. The method of claim 18 wherein in Step D the toasting step is practiced to puff the pieces along with toasting and drying.

20. The method of claim 19 wherein the cereal pellets are free of topically applied particulate or liquid anti-stickiness materials.

21. The method of claim 20 wherein in Step B, the pieces are cut to form a peripheral crimp seam binding together the first and second layers.

22. The method of claim 21 wherein each layer is of a different color.

23. The method of claim 13 wherein in Step D the microwave heating step is practiced with a field strength of about 150 to 300 V/cm.

24. The method of claim 23 wherein in Step B the forming step is practiced with compression ranging from about 100 to 6,000 psia.

25. The method of claim 24, further comprising the step of:
providing the puffed multilayered cereal pieces with a presweetening coating.

26. A multilayered R-T-E cereal piece prepared according to the method of claim 1.

27. A multilayered R-T-E cereal piece prepared according to the method of claim 2.

28. A multilayered R-T-E cereal piece prepared according to the method of claim 3.

29. A multilayered R-T-E cereal piece prepared according to the method of claim 4.

30. A multilayered R-T-E cereal piece prepared according to the method of claim 13.

31. A multilayered R-T-E cereal piece prepared according to the method of claim 15.

32. A multilayered R-T-E cereal piece prepared according to the method of claim 20.

33. A multilayered R-T-E cereal piece prepared according to the method of claim 5.

34. A multilayered R-T-E cereal piece prepared according to the method of claim 9.

35. A multilayered R-T-E cereal piece prepared according to the method of claim 12.

36. A multilayered puffed R-T-E cereal piece comprising:
A. a first intermediate puffed cooked cereal dough layer;
B. an overlaying second puffed cooked cereal layer;
C. an underlying third puffed cooked cereal layer;
D. at least one bond between the layers formed by mechanical compression;
wherein each layer has
  1) a puffed thickness of about 0.04 to 0.3 inch,
  2) a pellet count ranging from about 6 to 20 per 10 g,
  3) a bulk density of about 0.06 to 0.15 g/cc., and
  4) a moisture content of <6%.

37. The multilayered R-T-E cereal piece prepared according to the method of claim 36 wherein at least one cereal dough layer is of a different color or composition.

38. The multilayered R-T-E cereal piece of claim 37 wherein the piece further includes at least one layer of a non-cereal material intermediate to at least two cereal dough layers.

39. The multilayered R-T-E cereal piece of claim 38 wherein at least one layer comprises a whole grain based cooked cereal dough.

40. The multilayered R-T-E cereal piece of claim 39 wherein the pieces have a peripheral crimp seam binding together the third and second layers.

41. The multilayered R-T-E cereal piece of claim 40 wherein at least a portion of at least one intermediate dough layer is delaminatable from the adjacent layer.

42. The multilayered R-T-E cereal of claim 41 further including a presweetening coating.

43. The multilayered R-T-E cereal piece of claim 42 further including at least one fruit paste layer positioned intermediate between at least two dough layers.

44. A method for preparing a multilayered puffed farinaceous piece, comprising the steps of:
A. providing a laminated sheet having at least three discrete layers, in a stacked array defining a top layer and a bottom layer, and an intermediate layer, each of which is fabricated from a cooked cereal dough, adhered to at least a portion of each other by a bond formed by mechanical compression and wherein the cumulative thickness of the layers ranges between about 0.050 to 0.090 in.,
wherein the dough has a moisture content of about 18% to 35%,
wherein each layer is of a different color or composition,
wherein each layer ranges in thickness from about 0.025 to 0.045 in.,
wherein at least one cooked cereal dough layer comprises a whole wheat based cooked cereal dough, and
wherein the sheet further includes at least one layer of a non-cereal material intermediate at least two cereal dough layers;
B. forming the sheet into pieces, wherein, the pieces are cut to form a peripheral crimp seam binding together the top and bottom layers;
C. drying the pieces to a moisture content of about 9% to 13% to form dried puffable laminated cereal pellets, wherein the pellets have a pellet count of 12 to 40 per 10 g;
D. puffing the cereal pellets to form puffed multilayered cereal pieces and toasting the puffed cereal pieces to toast and finish dry the pieces to form toasted readyto-eat cereal pieces having a moisture content of less than 3% by weight, by exposure to a high intensity microwave field having a field strength of about 150 to 300 V/cm, wherein at least a portion of at least one intermediate layer is delaminatable from the adjacent layer; and E. providing the ready-to-eat cereal pieces with a presweetening coating.

45. The method of claim 44 further including:

coating the ready-to-eat cereal pieces with a sugar coating solution to form coated cereal pieces, drying the coated cereal pieces.

46. A method for preparing a multilayered puffed farinaceous piece, comprising the steps of:

A. providing a laminated sheet having at least three discrete layers in a stacked array defining a top layer and a bottom layer, at least two of which layers are fabricated from an unpuffed puffable cooked cereal dough, adhered to at least a portion of each other by a bond formed by mechanical compression, wherein each layer has a first and second major face, wherein at least one layer has at least one major face having corrugations, wherein the cumulative sheet thickness ranges from about 0.050 to 0.090 in., wherein the dough has a moisture content of about 18% to 35%, wherein at least one cereal dough layer is of a different color or composition, and wherein the layers each range in thickness from about 0.025 to 0.045 in.;

B. forming the sheet into pieces;

C. drying the pieces to a moisture content of about 9% to 13% to form dried puffable laminated cereal pellets, wherein the pellet count ranges from 12 to 40 per 10 g; and D. puffing the cereal pellets by exposure to a high intensity microwave field having a field strength of about 150 to 300 V/cm to form a puffed multilayered cereal piece.

47. A method for preparing a multilayered puffed farinaceous piece, comprising the steps of:

A. co-extruding at least three of the cereal doughs in the form of a laminated sheet, having at least three discrete layers, at least one of which layers is fabricated from an unpuffed puffable cooked cereal dough, said layers adhered to at least a portion of each other by a bond formed by mechanical compression, wherein each layer has a first and second major face, wherein each layer ranges in thickness from about 0.025 to 0.055 in., wherein the cumulative sheet thickness ranges from about 0.050 to 0.090 in., wherein the dough has a moisture content of about 18% to 35%, wherein at least one cereal dough layer is of a different color or composition, wherein at least one layer has at least one major face having corrugations, wherein at least one layer comprises a whole wheat based cooked cereal dough, and wherein at least one layer comprises a corn based cooked cereal dough;

B. forming the sheet into pieces, wherein the pieces are cut to form having a peripheral crimp seam peripherally binding together the layers, wherein the pieces are rectangular, wherein the peripheral crimp seam is on two edges, and wherein the pieces have two free edges; drying the pieces to a moisture content of about 9% to 13% to form dried puffable laminated cereal pellets; and D. puffing the cereal pellets by exposure to a high intensity microwave field having a field strength of about 125 to 350 V/cm to form puffed multilayered cereal pieces, and wherein the cereal pellets are free of topically applied particulate or liquid anti-stickiness materials.

\* \* \* \* \*